A. E. NEWTON.
CLUTCH.
APPLICATION FILED JAN. 11, 1911.

1,098,750.

Patented June 2, 1914.

Witnesses:
C. F. Mason
C. I. Hartnett

Inventor
A. E. Newton
by Attorneys
Southgate & Southgate

UNITED STATES PATENT OFFICE.

ALBERT E. NEWTON, OF WORCESTER, MASSACHUSETTS, ASSIGNOR, BY MESNE ASSIGN-
MENTS, TO REED-PRENTICE COMPANY, OF WORCESTER, MASSACHUSETTS, A
CORPORATION OF MASSACHUSETTS.

CLUTCH.

1,098,750.     Specification of Letters Patent.     Patented June 2, 1914.

Application filed January 11, 1911, Serial No. 602,005. Division of Patents Nos. 895,102, 895,104, and 895,105, granted August 4, 1908, and application Serial No. 441.933, filed July 6, 1908.

*To all whom it may concern:*

Be it known that I, ALBERT E. NEWTON, a citizen of the United States, residing at Worcester, in the county of Worcester and State of Massachusetts, have invented a new and useful Clutch, of which the following is a specification.

This invention relates to a clutch which while capable of general use has been found to be particularly useful when applied to back gearing, especially of upright and radial drills and drill presses.

This is a division of my three patents on power transmitting mechanism; gearing; and driving gearing for upright drills, Nos. 895,102, 895,104, and 895,105, respectively, granted August 4, 1908, and of my application for patent on gearing filed July 6, 1908, Serial No. 441,933.

The principal objects of the invention are to provide an improved friction clutch, and arrangement for operating the clutch, whereby efficient operation may be secured with a simple construction; to provide a construction of great strength which will occupy a relatively small space; to secure great ease of manipulation; to provide for taking up the wear and for easily operating the same; to provide operating fingers having a powerful leverage; to provide a construction in which the expansion is internal and has a great area equal to the entire width of the face; to provide a sensitive element which when engaged can not slip and which can have no half-way engagement but must be either operatively engaged or entirely disengaged; to provide a construction with two operating fingers having the expanding force equally divided between them; and to provide a construction in which there shall be a powerful ratio of power to work leverage of the fingers because of the incline of the end of the hub and in which the ratio is again multiplied on account of the leverage of the shipper lever.

Further objects and advantages of the invention will appear hereinafter.

Reference is to be had to the accompanying drawing in which—

Figure 1:
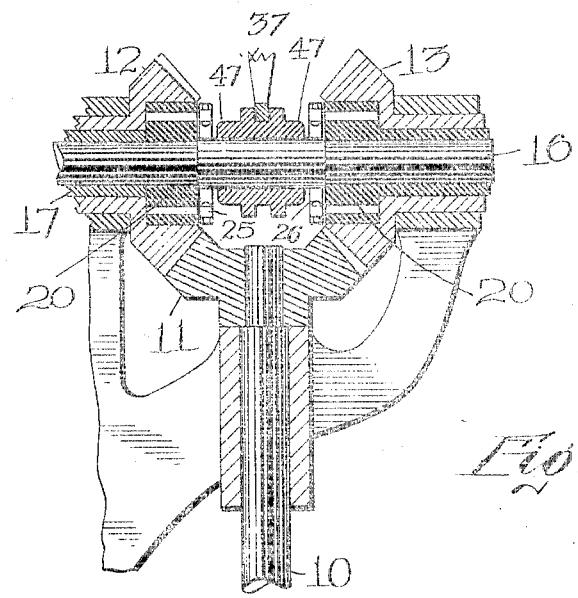
Figure 2:
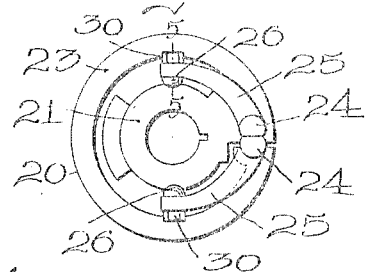
Figure 4:
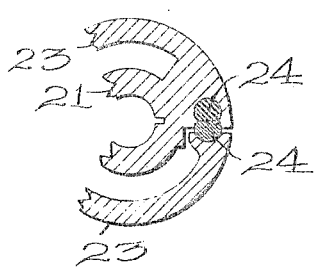
Figure 3:
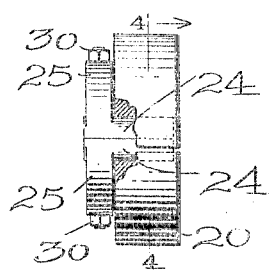
Figure 5:
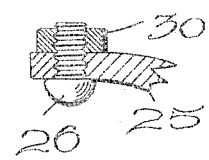

Figure 1 is a central sectional view through a driving shaft and gearing therefor showing a preferred embodiment of the invention. Fig. 2 is a detail end view of the clutch. Fig. 3 is a side elevation of Fig. 2 partly broken away to show interior construction. Fig. 4 is a sectional view on the line 4—4 of Fig. 2, and Fig. 5 is a detail enlarged sectional view on the line 5—5 of Fig. 2.

In the form of the invention shown in the drawings, a shaft 10 which is driven in any desired way, is shown as provided at its end with a bevel gear 11 which meshes with and drives gears 12 and 13 upon opposite sides thereof. These gears or wheels are mounted to run loose on a shaft 16. Fitting in sockets or grooves in the inner open faces of these gears are friction clutch rims 20. Secured on the shaft 16 is a sleeve 17.

Each friction clutch rim 20 consists of a hub 21 projecting from which is a circular rib 23, the end of which is cut off so as to be capable of radial movement so that it constitutes a split clutch ring, one end of which is rigid on the hub and the other is free. This split ring is adapted to be expanded against the inner surface of the socket in which it is located to connect the gear with the hub.

Fitting into segmental depressions or sockets in the fixed part of the hub and the free end of the circular rib respectively are two segmental studs or pins 24—24. The sides of these pins are slabbed where they normally bear on each other, so that they constitute eccentrics. Projecting from each of these pins is an operating arm 25, each of which carries a bearing head 26 at its free end. These arms extend inwardly so that the heads 26 are diametrically opposite. These heads are on screws which can be adjusted by nuts 30. Thus the clutch rim 20 is separated from the arms 25 by a circumferential slot adjacent to the transverse slot that separates the ends of the clutch ring 20.

Sliding on the driven shaft 16 and keyed thereto is a hub 27, each end 47 of which is tapered and fits in between the bearing heads 26 of the respective clutches. When the sliding hub 27 is moved in either direction one of the tapered ends 47 of the same forces the arms 25 of one of the clutches outwardly, and thereby expands the clutch ring 23 to engage the socket in the gear 12 or 13, so that the shaft 16 will be locked to, and will turn with, the bevel gear 12 or 13. Each pin 24 turns in its socket and engages the other pin 24 to assist in the expansion of the ring. The sliding hub 27 has a groove cut in the same, and engaging the same is a yoke 37 which can be actuated by a handle, so that either train of gearing can be used as desired by the operator by simple manipulation of said handle.

It is an advantageous construction to use two arms 25—25 to coöperate with the sliding tapered hub 27, as by having the bearing points of said arms diametrically opposed the expanding force is equally divided between them, and all tendency of the same to cramp or slip on the shaft 22 is eliminated.

The two fingers riding upon the spool simultaneously equalize the pressure on the spool thereby eliminating all friction between the spool and the shaft upon which it slides. The fingers are mounted in a floating manner to compensate for any unequal adjustment of the adjusting screws, thus insuring the spool to come into engagement without any side pressure.

By means of the constructions described the device is exceedingly simple and convenient to operate.

While I have illustrated and described a particular embodiment of the invention, I am aware that many modifications can be made therein by any person skilled in the art, and that the invention can be applied to other than bevel gearing constructions without departing from the scope of the invention as expressed in the claims. Therefore I do not wish to be limited to the particular details and applications illustrated, but What I do claim is:—

1. In a friction clutch, the combination of a split clutch ring having opposite adjacent sockets in the ends thereof, non-circular rockable pins in said sockets, and clutch operating arms extending inwardly from said pins.

2. In a friction clutch, the combination of a split clutch ring, transverse members located at the ends of said clutch ring having flat surfaces in contact with each other and adapted when turned upon their axes to separate the free ends of said clutch ring, arms on said members extending inwardly therefrom, and longitudinally movable means for pushing said arms out at their inner ends to turn said members and separate the free ends of the clutch ring.

3. In a friction clutch, the combination of a shaft, a hub fixed thereon, a split ring having one end rigid on the hub and the other free, arms supported by and projecting inwardly from the ends of the split ring, and means movable axially for engaging said arms and forcing them apart to expand the split ring.

4. In a friction clutch, the combination of a shaft, a hub fixed thereon, a split ring connected with said hub at one end and free at the other, the two ends of said ring having segmental depressions, a member rotatably mounted on the shaft and having a socket in which said ring is located, two segmental studs fitting in said depressions, a pair of arms each rigidly mounted on said studs, said arms projecting inwardly toward the center of the shaft from said studs, but diverging from each other, and an axially movable member for engaging said arms at diametrically opposite points and forcing them apart to expand the split ring.

5. As an article of manufacture, a friction clutch comprising a split ring having one end fixed and the other free, each end having a segmental depression therein, a segmental pin fitting in each of said depressions, said pins being in contact normally and being slabbed off where they are in contact, a pair of arms projecting inwardly from said pins and diverging from each other, and bearing heads on said arms at diametrically opposite points whereby when said bearing heads are forced apart the split ring will be expanded.

6. The combination with a shaft and wheel turning loosely thereon, of a friction device secured to said shaft and comprising a ring fitting within said wheel and split transversely, one end of the ring having a segmental depression, a segmental stud seated in said depression, means on the other end of the ring for engaging said stud, and means for simultaneously oscillating said stud in its seat and moving said means on the other end of the ring against the stud, whereby said means and stud coöperate with each other for forcing the ends of the ring apart.

7. The combination with an outer wheel having a hub off-set as set forth, of an inner device located within said wheel consisting of a ring split transversely, two pivoted operating arms having eccentrics arranged to engage each other and the ring sections formed by said transverse splitting, and a sliding member adapted to contact with the inner ends of said operating arms for turning said eccentrics in opposite directions.

In testimony whereof I have hereunto set my hand, in the presence of two subscribing witnesses.

ALBERT E. NEWTON.

Witnesses:
ALBERT E. FAY,
C. FORREST WESSON.